(12) United States Patent
Helling

(10) Patent No.: US 8,476,369 B2
(45) Date of Patent: Jul. 2, 2013

(54) METAL SALT NANOGEL-CONTAINING POLYMERS

(75) Inventor: Günter Helling, Odenthal (DE)

(73) Assignee: Bayer Innovation GmbH, Düsseldorf (DE)

( * ) Notice: Subject to any disclaimer, the term of this patent is extended or adjusted under 35 U.S.C. 154(b) by 0 days.

(21) Appl. No.: 12/598,119

(22) PCT Filed: Apr. 30, 2008

(86) PCT No.: PCT/EP2008/003490
§ 371 (c)(1),
(2), (4) Date: Mar. 25, 2010

(87) PCT Pub. No.: WO2008/135212
PCT Pub. Date: Nov. 13, 2008

(65) Prior Publication Data
US 2010/0178270 A1  Jul. 15, 2010

(30) Foreign Application Priority Data
May 2, 2007 (DE) .......... 10 2007 020 523

(51) Int. Cl.
*B01J 13/00* (2006.01)
*C08G 73/02* (2006.01)
*C08L 33/02* (2006.01)

(52) U.S. Cl.
USPC ........ 525/221; 525/55; 525/154; 525/165; 525/185; 525/190; 525/418; 525/472; 525/540

(58) Field of Classification Search
USPC ........ 525/50, 55, 154, 165, 185, 190, 418, 525/472, 540, 221
See application file for complete search history.

(56) References Cited

U.S. PATENT DOCUMENTS

| | | | | |
|---|---|---|---|---|
| 3,113,026 | A | * | 12/1963 | Sprung .......... 430/599 |
| 3,816,129 | A | * | 6/1974 | Fitzgerald .......... 430/569 |
| 4,426,438 | A | * | 1/1984 | Helling .......... 430/213 |
| 6,022,727 | A | | 2/2000 | Worden et al. |
| 6,524,439 | B2 | | 2/2003 | Chen et al. .......... 162/168.1 |
| 7,691,234 | B2 | | 4/2010 | Carr et al. .......... 162/181.6 |
| 7,932,313 | B2 | | 4/2011 | Eichman et al. .......... 524/556 |
| 2004/0097644 | A1 | | 5/2004 | Katou et al. .......... 524/425 |

FOREIGN PATENT DOCUMENTS

| | | |
|---|---|---|
| AU | 2008248978 | 11/2009 |
| CN | 20088014412 | 11/2009 |
| CR | 20090011068 | 10/2009 |
| DE | 3002287 | 1/1981 |
| EG | 2009111616 | 11/2009 |
| EP | 0033081 | 1/1981 |
| EP | A-1 153 936 | 11/2001 |
| EP | 1396507 | 9/2003 |
| EP | 1609830 | 6/2005 |
| EP | 2008749239 | 12/2009 |
| JP | A-1981-109212 | 8/1981 |
| JP | 08-269292 | 10/1996 |
| JP | 11-241293 | 9/1999 |
| JP | A-2004-091713 | 3/2004 |
| JP | 2005 206752 A | 4/2005 |
| JP | A-2006-037089 | 2/2006 |
| JP | 2010504575 | 11/2009 |
| KR | 1020097025110 | 12/2009 |
| MA | 20090032396 | 12/2009 |
| MX | 20090011242 | 10/2009 |
| PH | 12009502064 | 10/2009 |
| RU | 2 265 097 | 11/2005 |
| RU | 2 277 142 | 5/2006 |
| RU | 2009139210 | 10/2009 |
| WO | WO 02/24757 A | 3/2000 |
| WO | WO 00/31172 A | 6/2000 |
| WO | WO 03/002164 A | 1/2003 |
| WO | WO 2004/110610 A | 12/2004 |
| WO | PCT/EP2008/003490 | 4/2008 |

OTHER PUBLICATIONS

Written Opinion for Application No. PCT/EP2008/003490 issued on Apr. 30, 2008 which published as WO/2008/135212 on Aug. 8, 2008 (Inventor is G. Helling, Applicant is Helling Innovation UG).
International Search Report for Application No. PCT/EP2008/003490 issued on Apr. 30, 2008, which published as WO/2008/135212 on Aug. 8, 2008 (Inventor is G. Helling, Applicant is Helling Innovation UG).
International Preliminary Report for Patentability of Application No. PCT/EP2008/003490 issued on Apr. 30, 2008, which published as WO/2008/135212 on Apr. 2, 2009 (Inventor is G. Helling, Applicant is Helling Innovation UG).

* cited by examiner

Primary Examiner — Irina S Zemel
Assistant Examiner — Jeffrey Lenihan
(74) Attorney, Agent, or Firm — Ballard Spahr LLP

(57) ABSTRACT

The invention relates to a method for producing metal salt nanogel-containing aqueous dispersions, solid intermediate products and waterproof plastic products, thus allowing the simple production of novel products having homogeneously distributed agents, which exhibit, for example, an antimicrobial or barrier effect and/or have an absorbing capacity, such as with respect to oxygen, humidity, chemical, particularly gaseous compounds, or electromagnetic or radioactive radiation.

26 Claims, No Drawings

METAL SALT NANOGEL-CONTAINING POLYMERS

CROSS-REFERENCE TO RELATED APPLICATIONS

The present application is a National Phase Application of International Application No. PCT/EP2008/003490, filed Apr. 30, 2008, which claims priority to German Patent Application No. 10 2007 020 523.8, filed May 2, 2007, which applications are incorporated herein fully by this reference.

The invention relates to a method of producing water-resistant polymerization, polycondensation or polyaddition products comprising metal salt nanogel, and also to products producible using this method, and also to their use as moldings, coating materials, films, and fibers or as a masterbatch for the antimicrobial treatment of plastics, as an oxygen barrier, as a moisture barrier, as a barrier for chemical compounds or for the absorption of electromagnetic radiation or radioactive radiation.

U.S. Pat. No. 6,226,890 describes coats as moisture barriers which are composed of a polymeric binder and a drying agent which is incorporated by dispersion and has a particle size of 0.1 to 200 micrometers. Drying agents specified are, for example, metal oxides or metal halides. A disadvantage of layers obtained from these dispersions is the high haze, which prevents them being used for optically transparent materials or films.

U.S. Pat. No. 6,503,587 describes an oxygen barrier comprising coatings of a polymer with iron particles which are incorporated by dispersion and have particle sizes of 1 to 150 µm. Introducing the iron particles into the polymer necessitates a costly and inconvenient incorporation process. Moreover, the coats obtained with these mixtures are hazy.

From DE 101 46 050 the use of silver nanoparticles in combination with metal salts as a biocide in adhesives and coating materials is known. The metal salts are said to increase the efficacy of the silver nanoparticles. The methods shown therein for producing such materials have proven unsatisfactory with regard to the reproducible and homogeneous distribution of the coating materials in the coat.

DE 19707221 describes antibacterial and fungicidal polymer dispersions which comprise metal ions and are used as a protective polymer for other colloidal systems. The preparation is by direct copolymerization of monoethylenically unsaturated monocarboxylic or dicarboxylic acids such as acrylic acid with water-insoluble polymerizable compounds by an emulsion polymerization process. The metal ions are introduced by treatment with heavy metal salts of low solubility. The blending characteristics of polymers comprising metal ions and produced in this way with the polymer dispersion to be protected, however, are unsatisfactory, since, particularly when the levels of metal ions are relatively high, instances of flocculation are frequent, and the resulting blended dispersions exhibit unsatisfactory long-term stability. This method is therefore of only limited suitability for the production of stable dispersions.

DE 60102291 describes polymeric materials which comprise ionic copper oxide particles for antimicrobial treatment. The particles are 1 to 10 micrometers in size and project from the surface of the polymer. A smooth transparent plastic surface or film surface cannot be obtained with these particles.

DE 69806071 describes polycondensation products which include oxygen-removing subsegments. The possibility of producing barrier layers for oxygen from these materials, however, is greatly limited, since the only plastics which can be used are those which comprise these subsegments to a high degree.

DE 60108670 describes polymeric films with odor barrier properties as a result of the incorporation into the polymers of bis-fatty acid amides. A disadvantage of these films is the greatly restricted compatibility of many polymers for bis-fatty acid amides. Hence there may in particular be instances of exudation of the incorporated bis-fatty acid amides in the course of storage and in the event of temperature fluctuations.

U.S. Pat. No. 4,426,438 describes anionic copolymers comprising polyvalent metal cations, their preparation, and their use in photographic materials. The copolymers are used together with water-soluble polymers as binders in transparent coatings. Films or coatings comprising these mixtures are water-sensitive or water-soluble and are not suitable as robust service materials.

There is therefore a need for a simple and cost-effective method of producing polymeric products which comprise metal salt nanogels in a homogeneous distribution.

It is an object of the invention, therefore, to find such a method that does not have the disadvantages of the prior art.

The method of the invention involves first blending an aqueous dispersion of metal salt nanogels with an aqueous dispersion of a polymerization, polycondensation or polyaddition product. The aqueous dispersion which is formed in this procedure, modified with metal salt nanogel, can be used directly, for example, for coating purposes, and only then is dried. Alternatively, drying may take place directly after blending. The completed coating or completed polymeric product in accordance with the invention, after drying and in particular by subsequent simple heating, is obtained and features very good, homogeneous distribution of the metal salt nanogel in the polymeric product. The aqueous dispersion can also be dried to form an intermediate, which only later is subjected to further processing to give the desired coating and/or desired product.

The subject matter of the invention and the preferred embodiments thereof are described in the independent claims and in the claims appendant thereto.

The present invention provides a method of preparing an aqueous dispersion (D-III) comprising metal ions, characterized in that an aqueous dispersion (D-I) comprising metal salt nanogel is blended with an aqueous dispersion (D-II) of a polymerization product, polycondensation product or polyaddition product, it being possible for a water-resistant product to be obtained from dispersion (D-III) by drying, in particular followed by heating. The water-resistant product producible in this way may be used as such or may be part of an assembly, e.g., a water-resistant coating or a water-resistant component.

A water-resistant product for the purposes of the invention is notable more particularly for the fact that it is not soluble or is of low swellability in water. Not soluble means that the product on 24-hour treatment with water and subsequent drying at room temperature undergoes a decrease in weight by less than 5% by weight, preferably less than 0.5% by weight. Of low swellability means that on 24-hour treatment of the product with water the weight increase is less than 10% by weight, preferably less than 2% by weight.

The invention also provides an aqueous dispersion comprising metal salt nanogel, characterized in that it comprises metal salt nanogel and particles of a polymerization product, polycondensation product or polyaddition product, and which is produced preferably by the method described above.

The invention also provides a method of producing water-resistant polymerization, polycondensation or polyaddition products comprising metal salt nanogel, and also products produced by this method for use as moldings, coating materials, films or fibers or as a masterbatch for the antimicrobial treatment of plastics, as an oxygen barrier, as a moisture barrier, as a barrier for chemical compounds, or for the absorption of electromagnetic radiation or radioactive radiation.

By metal salt nanogel for the purposes of the invention are meant all polymeric particles having a diameter of the equal-volume spheres of not more than about 500 nm, containing at least one anionically charged polymer and, as counterions, positive ions, more particularly of at least one metal or metal complex. The diameter of the particles is preferably less than 200 nm and more preferably less than 80 nm. It has been found advantageous, moreover, if their diameter is at least about 5 nm, more particularly at least about 10 nm. Particularly preferred polymeric metal salt nanogel particles have a diameter of the equal-volume spheres of about 5 nm to about 200 nm.

The dispersions (D-I) comprising metal salt nanogel that are suitable for the method of the invention are produced preferably in a method which comprises at least the following three stages in the order stated. Before, between, and after these method stages it is possible for further method steps to be carried out, such as the addition of additives, concentration steps or washing steps, for example.

In stage 1 an aqueous crosslinked acrylic or methacrylic ester dispersion with a particle size of not more than about 500 nm is produced. It is produced preferably by emulsion copolymerization, in which at least one ethylenically unsaturated carboxylic ester, more particularly an acrylic or methacrylic ester, is polymerized in the presence of at least one difunctional or polyfunctional crosslinking monomer and of at least one emulsifier.

As ethylenically unsaturated carboxylic esters it is particularly preferred to use the esters of aliphatic, especially short-chain alcohols, with short-chain meaning that the alcohol residue comprises a maximum of 12 C atoms, preferably a maximum of 6 C atoms, and more preferably from 1 to 4 C atoms.

Particularly suitable difunctional or polyfunctional crosslinking monomers are monomers having two or more ethylenically unsaturated groups in the molecule. Particularly advantageous examples of such monomers are allyl compounds such as allyl ethers, for example, of which tetraallyloxyethane yields particularly good results. Also particularly suitable are alkenes or cycloalkenes having two or more double bonds. The use of divinylbenzene or difunctional and polyfunctional acrylates, in contrast, has proven less advantageous.

The fraction of crosslinking monomer, based on the total monomer amount, is preferably more than about 0.5 mol %, in particular more than about 1 mol %, and with particular preference at least about 3 mol %. With small fractions of crosslinking monomers, the hydrolysis produces high-viscosity gels, which are not very suitable for further processing by the method of the invention. In order to maximize the metal ion content without flocculation, however, the fraction of crosslinking monomer is preferably not more than 20 mol %, in particular not more than 10 mol %.

As emulsifiers, anionic and/or nonionic surface-active compounds are particularly suitable, but cationic emulsifiers less so.

The emulsion copolymerization takes place preferably in an aqueous medium, the water being preferably predominant and it being possible for it to contain less than about 50% by weight of other solvents which are miscible with water in the quantity employed.

In stage 2, the crosslinked methacrylate or acrylate dispersion obtained in stage 1 is hydrolyzed using basic compounds such as alkali metal hydroxide or ammonium hydroxide, for example. This produces anionic nanogels with alkali metal or ammonium counterions.

In stage 3, the alkali metal or ammonium ions introduced in stage 2 are replaced by polyvalent cations. This ion exchange may take place by addition of water-soluble salts of polyvalent metals, present in particular in aqueous solution, or by means of cation exchangers loaded with polyvalent metal ions.

Dispersions (D-I) comprising metal salt nanogel that are produced by this at least three-stage method allow the incorporation of high amounts of metal ions, and it has been found that they are then also suitable, in contrast to otherwise-produced dispersions, outstandingly for blending with aqueous dispersions (D-II), in which context they do not tend toward flocculation or unwanted increases in viscosity, with the consequence that it is possible to obtain dispersions (D-III) with long-term stability without unwanted agglomerates.

In terms of the total molar amount of the monomers present in the polymer, the anionically charged polymers contain typically from about 1 to 100 mol %, preferably from about 20 to 100 mol %, and more preferably from about 50 to 85 mol % of covalently bonded anionic groups.

Of the total molar amount of the counterions, in one preferred embodiment of the invention ions with a valency of two and/or more make up preferably from about 1 to 100% mol %, in particular from about 20 to 100 mol %, and more preferably from about 50 to 98 mol %. The remainder to 100 mol % of counterions is formed, for example, by monovalent positive ions (e.g., metal ions, metal complexes or ammonium ions) and/or by positive groups bonded covalently to the polymer.

In another preferred embodiment of the invention, the counterions comprise from about 1 to 100 mol %, in particular from about 20 to 100 mol %, of Ag(+).

Preferred metal salt nanogels of the invention with divalent or polyvalent metal ions are known from DE 3002287 and can be produced by the methods described therein. Preferred metal salt nanogels can be described by the following general formula:

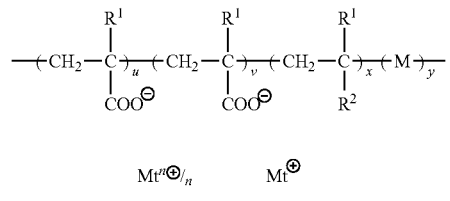

in which
$R^1$ is hydrogen, methyl or carboxymethyl,
$R^2$ is the radical of an organic crosslinker compound having at least one further copolymerizable or copolymerized C—C double bond,
M is polymerized units of an ethylenically unsaturated monomer which is copolymerizable with acrylic acid, methacrylic acid, acrylic ester or methacrylic ester,
$Mt^{n\oplus}$ is an n-valent metal cation with n=2, 3 or 4,
$Mt^{\oplus}$ is in particular an alkali metal cation or an ammonium cation, u, v, x, y are the molar fractions of the polymerized monomers present in the copolymer, in mol %, and specifically:
u 5-99 mol %, preferably 10-90 mol %
x 0.5-10 mol %, preferably 1-5 mol %
v+y 0-94.5 mol %, preferably 0-85 mol %

Metal ions $Mt''^\oplus$ used with preference are polyvalent ions of magnesium, calcium, strontium, barium, iron, cobalt, nickel, copper, zinc, lead, cadmium, tin, mercury, bismuth, gold, uranium, aluminum, antimony, cerium, chromium, europium, gallium, germanium, indium, lutetium, manganese, neodymium, osmium, palladium, platinum, plutonium, radium, rhenium, rhodium, rubidium, ruthenium, samarium, scandium, tantalum, tellurium, terbium, thallium, thorium, thulium, titanium, tungsten, uranium, vanadium, ytterbium, and zirconium.

Metal ions $Mt''^\oplus$ used with particular preference are polyvalent ions of iron, cobalt, nickel, copper, zinc, lead, aluminum, palladium, and platinum.

The metal ions may also take the form of the hydrate, amine complexes or other complexes.

In one preferred embodiment the water-resistant products which can be produced in accordance with the invention, such as polymeric articles, films or coatings, for example, are optically transparent. Transparency for the purposes of the invention means that texts, images or objects beneath the film or coating are clearly perceptible.

In a further preferred embodiment of the present invention the dispersion of the invention is added to a paint, stain, primer or wood preservative in order thus to give corresponding products of the invention having an antimicrobial action, absorption properties or barrier properties.

An aqueous dispersion for the purposes of the invention is a dispersion comprising water as the main constituent of its external phase. The water may contain, to an extent of less than 50% by weight, preferably less than 20% by weight, water-miscible organic solvents such as, for example, methanol, ethanol, isopropanol, n-propanol, acetone, tetrahydrofuran, dioxane, dimethylformamide, formamide or N-methylpyrrolidone.

The polymer dispersions may also comprise high-boiling or low-boiling, water-insoluble solvents. The high-boiling solvents are used in an amount of 0.01% to 50% by weight, based on the polymer. Particular preference is given to a range of 0.1%-30% by weight. Examples of high-boiling solvents are phthalic esters such as dibutyl phthalate, dinonyl phthalate, diethylhexyl phthalate, phosphoric esters such as tricresyl phosphate, adipic esters such as dioctyl adipate and dibutyl adipate. The low-boiling solvents are used in an amount of 0.01% to 100% by weight, based on the polymer. Particular preference is given to a range from 1.0% to 50% by weight. The low-boiling solvents are preferably used only during the method of the invention for producing polymerization, polycondensation or polyaddition products comprising nanoscale silver particles or silver halide particles. In the course of the drying process they are removed again together with the water. Examples of low-boiling solvents are n-hexane, n-heptane, cyclohexane, ethyl acetate, methyl acetate, methylene chloride, methanol, ethanol, isopropanol, dioxane, acetonitrile, tetrahydrofuran, chloroform, benzene, and toluene. The use of mixtures of low-boiling and high-boiling mixtures is possible.

The weight ratio of metal salt nanogel to the polymerization, polycondensation or polyaddition products may vary within wide ranges. Preference is given to a weight ratio of metal salt nanogel to polymerization, polycondensation or polyaddition products of 0.5 to $10^{-10}$:1, and more preferably a ratio of 0.2 to $10^{-6}$:1.

The dispersion of the invention may be used, for example, for coating and for that purpose may be applied by customary techniques to any desired articles. For example, medical instruments can be coated antimicrobially by standard techniques such as spraying, dipping or brushing, and, as described below, may be provided with efficient antimicrobial protection by simple drying and heating.

With advantage it is also possible for articles of everyday use, such as handles (e.g., door handles and window handles), switches such as, for example, light switches, railings, such as stair railings, for example, keycaps, keyboards, toilet lids, toilet brushes, shower fittings, telephone receivers, children's toys, more particularly plastic toys, films, fibers, fabrics, textiles or other frequently touched surfaces to be coated with a protection in accordance with the present invention, and/or to comprise a water-resistant product in accordance with the invention, as a result of which, for example, stubborn attachment of pathogens to such surfaces is countered. In public areas in particular, such as in toilets, and especially in swimming baths and hospitals, this avoids a considerable risk of infection and may replace the disinfection which is generally necessary, or at least may reduce its necessary frequency or allow less aggressive disinfectants.

In the building segment, the dispersion of the invention is used advantageously to control and prevent mold infestation, by the treatment of walls or wall coverings with the dispersion of the invention. Advantageously also sealants, roofing shingles, and insulating materials are treated antimicrobially with it.

It is advantageous, furthermore, to carry out antimicrobial treatment of containers and instruments for plant cultivation and also, generally, containers to be kept germ-free, such as, for example, Petri dishes, with the aid of the dispersion of the invention.

Furthermore, the dispersion of the invention is used to coat films or articles in order to obtain barrier properties and/or absorption properties with respect to oxygen, moisture or other gaseous substances. The metal salts are selected in accordance with the desired barrier effect. For example, dispersions of the invention with iron(II) salt nanogel are used as an oxygen or ozone barrier. Coatings with copper(II) and zinc(II) salt nanogel are suitable as a barrier for foul-smelling compounds such as hydrogen sulfide, mercaptans, amines or ammonia. Layers with dehydrated metal ions are suitable moisture barriers. Layers with heavy metal ions such as lead ions, for example, are suitable for attenuating radioactive rays.

With a suitable selection of the metal ions, which is easy to achieve by routine experiments, and of the residual moisture content of the material, it is also possible to use the materials of the invention to produce a defined antistatic effect.

Moreover, it is possible to achieve an optical filter effect in the visible, UV or infrared region by means of light-absorbing metal ions and/or complexes thereof.

Likewise it is possible to use mixtures of dispersions of the invention with different metal ions and/or different polymeric counterions. In this way it is possible to combine a plurality of functionalities in one layer, such as, for example, bactericidal surfaces with barrier properties.

In the context of the use of the dispersions of the invention for barrier purposes, the barrier coatings may be combined with other known barrier materials or barrier films of ethylene-vinyl alcohol copolymer or polyvinylidene chloride copolymer. For example, an ethylene-vinyl alcohol copolymer film may be coated with a dispersion of the invention comprising iron(II) ions in order to achieve a further reduction in the known low oxygen permeability of ethylene-vinyl alcohol copolymer.

In order, in accordance with the present invention, to obtain a polymeric article or a polymeric coating from the dispersion of the invention, first of all the water is removed from the dispersion to leave a water content of not more than 20% by weight, preferably of not more than 10% by weight, more preferably of 5% by weight, and more particularly of not more than 1% by weight. The removal of the water is carried out preferably by distillation or drying, such as, for example, convection drying, radiation drying, belt drying, spray drying or freeze drying.

The solid intermediate obtained from the dispersion in this way is likewise provided by the present invention and for subsequent use may be stored or may be further-processed directly to give a polymeric article. It is also possible to obtain the intermediate in powder form and to apply it in this form for coating purposes or initially to suspend it again in water or solvents in which it is insoluble or soluble only to a low degree. Moreover, after being melted, the solid intermediate can be converted into granules and in that form stored and further-processed.

In one preferred embodiment of the present invention the solid intermediate comprises, in addition to the polymerization product, polycondensation product or polyaddition product of the invention, at least one further polymer which may be added to the aqueous dispersion itself and which remains in the intermediate after the drying of the dispersion. Preferably, however, the further polymer is mixed with the solid intermediate obtained initially, to give a preferred intermediate. The further polymer is preferably not loaded with nanoscale polymeric metal salt particles, and, as a result of the blending, allows more precise adjustment of the desired effect.

As described for the dispersion, the solid intermediate as well may be admixed with further adjuvants in accordance with the intended use, in order, for example, to modify its keeping properties, capacity for further processing, odor or else appearance.

In another preferred embodiment of the present invention, the solid intermediate is added to a paint, coating material, a stain, a primer or a wood preservative in order thus to obtain corresponding products of the invention with an antimicrobial action, barrier properties, absorption of electromagnetic radiation or radioactive radiation. In the case of aqueous paint formulations, the intermediate is incorporated preferably in solid, pulverized form into the paint, by dispersion, or an aqueous dispersion of nanoscale polymeric metal salt particles is stirred together with the water-based paint. In the case of solvent-based paints, the intermediate is dissolved directly in the paint or is dissolved beforehand in an organic solvent or solvent mixture and then stirred together with the paint. In that case it is advantageous to use a solvent or solvent mixture which is present in the paint.

Suitable fields of application for the solid intermediate in accordance with the present invention, and also for its preparations, are, for example, the same as those described above for the dispersion.

From the solid intermediate, in accordance with the present invention, a polymer or a polymeric article or a polymeric coating is obtained by subjecting the intermediate to conditions in which it undergoes at least partial coalescence.

Where the intermediate has been admixed with a further polymer, in the form of granules, for example, the polymeric article or polymeric coating may also be produced in the course of the processing customary for the further polymer, particularly when the further polymer is predominant. Granules or powder of the intermediate may preferably be mixed with granules of the further polymer, and, after being melted, may be subjected to further processing by the known methods such as extrusion, coextrusion, spinning or injection molding, to give films, fibers, sheets, rods or filaments. In the case of multi-ply films produced by coextrusion, preferably only the outer layers are treated biocidally or provided with a barrier functionality. Examples of further polymers are polyesters, PET, polycarbonates, polyurethanes, polyamides, polyalkylenes such as PE, PP, polystyrene, poly(meth)acrylates, ABS, cellulose triacetate, fluoro-polymers, polyethers, POM, and elastomers.

The fields of application that are suitable for the polymeric article or the polymeric coating in accordance with the present invention are, for example, the same as those described above for the dispersion. In the case of products such as the antimicrobially treated articles of everyday use that were exemplified there, such as, for example, door handles and window handles, glass sheets or plastic sheets, spectacle lenses, contact lenses, food films, electronic protection film, medicinal product packaging, light switches, railings, keyboards, toilet lids, toilet brushes, shower fittings, telephone receivers, children's toys, more particularly plastic toys, films, fibers, woven fabrics, textiles or other surfaces with frequent contact, wall coatings, wall coverings, sealants, roofing shingles, and insulating materials, containers and apparatus for plant breeding, and also, generally, containers or surrounds to be kept germ-free, such as Petri dishes, water tanks, water pipes or insulation tanks, for example, polymeric articles are articles of the invention when the products are at least partly composed of a polymer of the invention or coated therewith.

The products produced by the method of the invention may be admixed with the additives which are typically used for polymers, such as, for example, stabilizers, UV absorbers, dyes, optical brighteners, metal or metal oxide nanoparticles, plasticizers, lubricants or pigments. The additives may be added during the production method or thereafter.

The products produced by the method of the invention may be blended with other polymerization, polycondensation or polyaddition products. By means of coating methods or coextrusion methods it is also possible to produce films in which only the top and/or bottom layer comprises/comprise nanoscale polymeric metal salt particles.

The products produced by the method of the invention may further comprise a residual fraction of water. The water fraction, based on the polymerization, polycondensation or polyaddition products, is preferably below 10 percent by weight and more particularly below 2 percent by weight. When the products of the invention are used as moisture barriers, the water fraction is preferably below 0.1 percent by weight.

Removing the water from the dispersion of the invention, and initiating coalescence, may also be carried out in one method step, e.g., at sufficiently high temperature. If the glass transition temperature or melting temperature of the polymerization, polycondensation or polyaddition product is below room temperature, heating is not absolutely necessary. Coalescence may then take place at room temperature.

Coalescence means that the polymeric particles present in the intermediate slowly flow together and bond or fuse with one another, a phenomenon which is apparent under the light or electron micrograph. This process is also referred to as film-forming. Preferably, based on the number, at least 20% of the particles, more preferably at least 50% of the particles, and with further preference at least 70% of the particles have undergone coalescence.

The coalescence may be induced, for example, by exposure to pressure, but it is preferred to expose the intermediate to a temperature which is high enough in order to lead to coalescence.

This operation takes place usually above the glass transition temperature of the polymerization, polycondensation or polyaddition product, and more particularly in the vicinity of through to above its melting point.

The aqueous dispersions of a polymerization, polycondensation or polyaddition product that are used for preparing the dispersions of the invention are known and are also described in the literature under the designation of polymer latex.

The aqueous dispersion of a polymerization product may be obtained by an emulsion polymerization process as described, for example, in "Giesla Henrici-Olive-S. Oliver Polymerisation Verlag Chemie 1969 section 1.11.3. Emulsionspolymerisation". An ethylenically unsaturated compound, also called a monomer, is introduced with addition of an emulsifier such as, for example, sodium palmitate or $C_{12}$-$C_{14}$-sulfonate in water. The polymerization is started using a water-soluble initiator. The polymerization takes place not in the monomer droplets but rather in the micelles formed from the emulsifier. The polymer is obtained as a finely divided dispersion or latex. Depending on the monomer or monomer mixtures used, different polymer or copolymer latices are obtained. The nature and amount of the emulsifier controls the size of the latex particles. Examples of monomers for preparing polymer latices or copolymer latices are 2-hydroxypropyl acrylate, methacrylic acid salt, acrylonitrile, α-chloroacrylonitrile, methacrylonitrile, 2-hydroxypropyl methacrylate, N-vinyl-2-pyrrolidone, 1,3-butadiene, vinyl ethers, acrylamide, allyl alcohol, N-methylolacrylamide, pentyl acrylate, n-butyl acrylate, benzyl acrylate, 1-butyl methacrylate, 5-methyl-1,3,6-heptatriene, 1,1-dihydroperfluorobutyl acrylate, benzyl methacrylate, 3-oxo-n-butyl acrylate, cyclohexyl acrylate, cyclopentyl acrylate, cetyl acrylate, cyclohexyl methacrylate, cyclopentadiene, 2-norbornylmethyl acrylate, 2-norbornylmethyl methacrylate, ethyl methacrylate, ethylene, chlorostyrene, isobutyl acrylate, 2-ethylhexyl acrylate, 2-ethylhexyl methacrylate, 2-isobornyl methacrylate, chloroprene, n-butyl methacrylate, isobutyl methacrylate, 3-oxo-n-butyl methacrylate, isopropyl methacrylate, lauryl acrylate, lauryl methacrylate, methyl acrylate, methyl methacrylate, methyl vinyl ketone, n-octyl acrylate, n-octadecyl acrylate, n-octadecyl methacrylate, 2-ethoxyethyl acrylate, 2-ethoxyethyl methacrylate, n-octyl methacrylate, 2-methoxyethyl methacrylate, 2-methoxyethyl acrylate, ethyl acrylate, propyl acrylate, dicyclopentenyl acrylate, 2,2,2-trifluoroethyl-n-hexyl acrylate, styrene, sec-butyl acrylate, p-bromostyrene, p-chlorostyrene, p-fluorostyrene, m-chlorostyrene, neohexyl acrylate, vinyl acetate, vinyl chloride, vinylidene chloride, m- and p-vinyltoluene, alpha-methylstyrene, acrylic acid, methacrylic acid, vinylsulfonic acid Na salt, monomethyl itaconate, p-styrenesulfonic acid Na salt, 2-acrylamido-2-methylpropanesulfonic acid Na salt, methylenebisacrylamide, ethylene dimethacrylate, divinylbenzene, allyl acrylate, ethylidene diacrylate, 1,6-hexamethylene dimethacrylate, 2-acetoacetoxyethyl methacrylate, methacrylic acid, acrylic acid, methacrylamide, and triallyl isocyanurate. Furthermore, latices with a specific construction, such as core-shell latices or latices with graft copolymer structures, are also suitable.

Dispersions of polyesters and copolyesters, also referred to as polyester latices and copolyester latices, are known from EP 78559 and EP 29620, for example. Copolyester latices are prepared by polycondensation from difunctional or polyfunctional alcohols and difunctional or polyfunctional carboxylic acids or polyfunctional carboxylic acid derivatives. Examples of dicarboxylic acids or dicarboxylic acid derivatives are terephthalic acid, dimethyl terephthalate, succinic acid, maleic acid, dimethyl adipate, cyclohexanedicarboxylic acid, dimethyl phthalate. Examples of polyfunctional alcohols are glycol, butanediol, hexanediol, neopentyl alcohol. For preparing emulsifiable or self-emulsifying copolyesters, additionally, dicarboxylic acids or dicarboxylic esters containing carboxyl groups or sulfo groups are used, such as sulfoisophthalic acid or sodium dimethyl 5-sulfoisophthalate, for example.

These copolyesters are suitable for forming aqueous dispersions in a self-emulsification process. The copolyesters are dissolved in a low-boiling solvent. Subsequently water and an emulsifier are added and thereafter the solvent is removed by evaporation. In this way, finely disperse copolyester latices are obtained without the use of dispersing apparatus.

The polyaddition products that are suitable for the purpose of the invention are preferably modified conically. In particular, ionomeric polyaddition products or polycondensation products are used. Ionomeric polyaddition products are known from U.S. Pat. No. 6,313,196 and EP 049399.

The ionomeric polyaddition products or polycondensation products that are used in accordance with the invention contain, per 100 g, 4 to 180 milliequivalents, preferably 4 to 100 milliequivalents, of ionic groups and/or groups which can be converted into ionic groups, and, if desired, 1% to 20% by weight of alkylene oxide units of the formula —$CH_2$—$CH_2$—O— that are incorporated within a polyether chain, it being possible for the polyether chain to be present pendantly or in the main chain.

The ionomeric polyaddition products or polycondensation products which can be used in accordance with the invention, and for which, below, the expression "ionomeric products" will be used, include polyurethanes, polyesters, polyamides, polyureas, polycarbonates, polyacetals or polyethers, and also further ionomeric products which belong to two or more polymer types simultaneously, such as polyester-polyurethanes, polyether-polyurethanes or polyester-polyureas, for example.

Ionomeric products of the kind used in accordance with the invention are known per se and are described in, for example, Angewandte Makromolekulare Chemie 26 (1972), pages 45 to 106; Angewandte Makromolekulare Chemie 82 (1979), pages 53 ff.; J. Oil. Col. Chem. Assoc. 53 (1970), page 363. Further descriptions of suitable ionomeric products are found in German laid-open specifications (DE-A-) 26 37 690, 26 42 973, 26 51 505, 26 51 506, 26 59 617, 27 29 245, 27 30 514, 27 32 131, 27 34 576, and 28 11 148.

Ionomeric products with anionic groups are preferred. Ionomeric products that are especially suitable for the method of the invention are described in DE-B2-1 472 746. These ionomeric products are based on polyurethanes obtained from compounds having two or more reactive hydrogen atoms, with a molecular weight of 300 to 10 000, polyisocyanates, and, if desired, chain extenders with reactive hydrogen atoms. In the preparation of these polyurethanes, or subsequently, isocyanate groups they still contain are reacted with a compound having at least one active hydrogen atom and at least one saltlike group or groups capable of salt formation. Where compounds having groups capable of salt formation are used, the resultant anionic polyurethanes are subsequently subjected, in a manner known per se, to at least partial conversion to the salt form.

The term "saltlike group" comprehends preferably the following moieties: —$SO_3^-$ or —$COO^-$.

Suitable starting components for preparing the anionic polyurethanes are, for example, the compounds described below:

I. Compounds with Active Hydrogen Atoms

These compounds are substantially linear and have a molecular weight of about 300 to 10 000, preferably 500 to 4000. The compounds, which are known per se, possess terminal hydroxyl and/or amino groups. Preference is given to polyhydroxyl compounds, such as polyesters, polyacetals, polyethers, polyamides, and polyesteramides. The hydroxyl number of these compounds corresponds to about 370 to 10, more particularly 225 to 28.

Polyethers include, for example, the polymerization products of ethylene oxide, propylene oxide, tetrahydrofuran, and butylene oxide, and also their copolymerization or graft polymerization products, and also the condensates obtained by condensation of polyhydric alcohols or mixtures thereof, and the products obtained by alkoxylation of polyhydric alcohols.

Suitable polyacetals include, for example, the compounds which can be prepared from hexanediol and formaldehyde. Suitable polyesters, polyesteramides, and polyamides are the predominantly linear condensates obtained from polybasic saturated carboxylic acids and polyhydric saturated alcohols, amino alcohols, diamines, and mixtures thereof.

It is also possible to use polyhydroxyl compounds which already contain urethane groups or urea groups, and also to use unmodified or modified natural polyols such as castor oil or carbohydrates.

It will be appreciated that, in order to vary the lyophilicity or hydrophobicity and the mechanical properties of the method products, mixtures of different polyhydroxyl compounds can be used.

II. Polyisocyanates

Suitable polyisocyanates are all aromatic and aliphatic diisocyanates such as, for example, 1,5-naphthylene diisocyanate, 4,4'-diphenylmethane diisocyanate, 4,4'-diphenyldimethylmethane diisocyanate, di- and tetra-alkyldiphenylmethane diisocyanate, 4,4'-dibenzyl diisocyanate, 1,3-phenylene diisocyanate, 1,4-phenylene diisocyanate, the isomers of tolylene diisocyanate, where appropriate in a mixture, preferably the aliphatic diisocyanates, butane 1,4-diisocyanate, hexane 1,6-diisocyanate, dicyclohexylmethane diisocyanate, cyclohexane 1,4-diisocyanates, and isophorone diisocyanate.

III. Chain Extenders

The chain extenders with reactive hydrogen atoms include the following:
1. The customary glycols, such as ethylene glycol or condensates of ethylene glycol, butanediol, propane-1,2-diol, propane-1,3-diol, neopentylglycol, hexanediol, bishydroxymethylcyclohexane;
2. the aliphatic, cycloaliphatic, and aromatic diamines such as ethylenediamine, hexamethylenediamine, 1,4-cyclohexyldiamine, benzidine, diaminodiphenylmethane, the isomers of phenylenediamine, hydrazine, ammonia;
3. amino alcohols such as ethanolamine, propanolamine, butanolamine;
4. polyfunctional amines or hydroxyl compounds such as diethylenetriamine, triethylenetetramine, tetraethylenepentamine, pentaethylenehexamine, hexaethyleneheptamine, glycerol, pentaerythritol, 1,3-diaminoisopropanol, 1,2-diaminopropanol, the monooxalkylated polyamines, such as, for example, N-oxethylethylenediamine, N-oxethylhydrazine, N-oxethylhexamethylenediamine;
5. water.

IV. Compounds Capable of Salt Formation
1. Compounds with an existing acidic moiety.
   a) Hydroxy acids such as, for example, glyceric acid, lactic acid, trichlorolactic acid, malic acid, dioxymaleic acid, dioxyfumaric acid, tartaric acid, dioxytartaric acid, citric acid, dimethylolpropionic acid, and dimethylolbutyric acid, the aliphatic, cycloaliphatic, aromatic, and heterocyclic mono- and diaminocarboxylic acids such as glycine, α- and β-alanine, 6-aminocaproic acid, 4-aminobutyric acid, the isomeric mono- and diaminobenzoic acids, the isomeric mono- and diaminonaphthoic acids;
   b) hydroxy- and carboxysulfonic acids; 2-hydroxyethanesulfonic acid, 2-phenolsulfonic acid, 3-phenolsulfonic acid, 4-phenolsulfonic acid, 2,4-phenolsulfonic acid, sulfoacetic acid, m-sulfobenzoic acid, p-sulfobenzoic acid, benzoic-1-acid-3,5-disulfonic acid, 2-chlorobenzoic-1-acid-4-sulfonic acid, 2-hydroxybenzoic-1-acid-5-sulfonic acid, naphthol-1-sulfonic acid, naphthol-1-disulfonic acid, 8-chloronaphthol-1-disulfonic acid, naphthol-1-trisulfonic acid, naphthol-2-sulfonic-1-acid, and naphthol-2-trisulfonic acid;
   c) aminosulfonic acids; amidosulfonic acid, hydroxylaminemonosulfonic acid, hydrazinedisulfonic acid, sulfanilic acid, N-phenylaminomethanesulfonic acid, 4,6-dichloroaniline-2-sulfonic acid, 1,3-phenylenediamine-4,6-disulfonic acid, naphthyleneamine-1-sulfonic acid, naphthylamine-2-sulfonic acid, naphthylaminedisulfonic acid, naphthylaminetrisulfonic acid, 4,4'-di(p-aminobenzoylamino)diphenylurea-3,3'-disulfonic acid, phenylhydrazine-2,5-disulfonic acid, taurine, methyltaurine, butyltaurine, 3-aminobenzoic-1-acid-5-sulfonic acid, 3-aminotoluene-N-methanesulfonic acid, 4,6-diaminobenzene-1,3-disulfonic acid, 2,4-diaminotoluene-5-sulfonic acid, 4,4'-diaminodiphenyl-2,2'-disulfonic acid, 2-aminophenol-4-sulfonic acid, 4,4'-diaminodiphenyl ether 2-sulfonic acid, 2-aminoanisole-N-methanesulfonic acid, 2-aminodiphenylaminesulfonic acid, ethylene glycol sulfonic acid, 2,4-diaminobenzenesulfonic acid, N-sulfonatoethylethyleneamine;
   d) the hydroxy- and aminocarboxylic acid and sulfonic acids, polycarboxylic and polysulfonic acids further include the (optionally hydrolyzed) addition products of unsaturated acids such as acrylic acid, methacrylic acid, vinylsulfonic acid, styrenesulfonic acid, and unsaturated nitriles such as acrylonitrile, of cyclic dicarboxylic anhydrides such as maleic acid, phthalic acid, succinic anhydride, of sulfocarboxylic anhydrides such as sulfoacetic and o-sulfobenzoic anhydride, of lactones such as β-propiolactone, γ-butyrolactone, the addition products of the reaction products of olefins with sulfur trioxide such as carbyl sulfate, of epoxycarboxylic and -sulfonic acids such as glycidic acid, 2,3-epoxypropanesulfonic acid, of sultones such as 1,3-propane sultone, 1,4-butane sultone, 1,8-naphthyl sultone, of cyclic sulfates such as glycol sulfate, of disulfonic anhydrides such as benzene-1,2-disulfonic anhydride with aliphatic and aromatic amines such as 1,2-ethylenediamine, 1,6-hexamethylenediamine, the isomeric phenylenediamines, diethylenetriamine, triethylenetetramine, tetraethylenepentamine, and also the addition products of sodium hydrogensulfite with olefinically unsaturated compounds such as allyl alcohol, maleic acid, maleic acid bis-ethylene and bis-propylene glycol esters;
   e) hydrazinecarboxylic acids.

2. Reactive compounds having 3 to 7 ring members which have saltlike groups or groups capable of salt formation after ring opening:
   a) dicarboxylic anhydrides such as succinic anhydride, maleic anhydride, optionally hydrogenated phthalic anhydride;
   b) tetracarboxylic dianhydrides such as 1,2,4,5-benzenetetracarboxylic anhydride;
   c) disulfonic anhydrides such as benzene-1,2-disulfonic anhydride;
   d) sulfocarboxylic anhydrides such as sulfoacetic anhydride, o-sulfobenzoic anhydride;
   e) sultones such as 1,3-propane sultone, 1,4-butane sultone, 1,8-naphthsultone;
   f) lactones such as β-propiolactone, γ-butyrolactone;
   g) epoxycarboxylic acids such as glycidic acids, optionally in the form of their alkali metal salts;
   h) epoxysulfonic acids such as 2,3-epoxypropane-1-sulfonic acid, optionally in the form of their alkali metal salts, and also the adducts of epoxyaldehydes and alkali metal hydrogen sulfites, such as, for example, the bisulfite compound of glycidaldehyde.

The above acidic moieties can be converted into the salt form in a usual way by reaction with the compounds specified below: inorganic bases, basic compounds or compounds which eliminate bases, such as monovalent metal hydroxides, metal carbonates, and metal oxides such as sodium hydroxide, potassium hydroxide, sodium carbonate, potassium carbonate, sodium hydrogencarbonate. Additionally, organic bases, such as tertiary amines, e.g., trimethylamine, triethylamine, dimethylamineethanol, dimethylaminepropanol, ammonia, and the like.

Suitable structural components are, in addition, for example, monohydric or dihydric alcohols which have ethylene oxide units incorporated within polyether chains.

Where monofunctional, nonionically hydrophilic polyethers of this kind are used as well it may often be of advantage to prevent premature chain termination through the accompanying use of structural components having a functionality of more than two. The monofunctional polyethers of the last-mentioned general formula are prepared by processes which are known per se, as are described, for example, in U.S. Pat. Nos. 3,905,929, 4,190,566 or 4,237,264.

Structural components of this kind provide the polyurethanes for use in accordance with the invention with additional, local hydrophilicization, electrolyte stability, freeze stability, and improved lubricity properties.

The amount of the polyisocyanates is preferably chosen such that all of the groups that are reactive with isocyanate groups undergo reaction.

The reaction is carried out where appropriate with the accompanying use of solvents, in which case low-boiling solvents having a boiling point of less than 120° C., such as acetone, methyl ethyl ketone, acetonitrile, tetrahydrofuran, and dioxane, for example, are preferably suitable, and may optionally, proportionally, contain water. Solvents for inorganic bases and compounds having at least one hydrogen that is reactive with isocyanate groups, and at least one saltlike group or group capable of salt formation, that are used may be water, optionally without additions of organic solvents.

The predominantly linear, high molecular mass, anionic polyurethanes are obtained in general as clear to slightly opalescent solutions in the stated polar solvents. Their solids content is about 5% to 50% by weight in terms of ionic polyurethane. Preference is given to using polyester- or polyether-polyurethanes.

The average particle size of the dispersions of the polymerization, polycondensation or polyaddition products used in accordance with the invention is in the range from 30 nm to 1000 nm, preferably in the range from 50 nm to 200 nm. Both homodisperse and polydisperse dispersions can be used.

The preparation of the polymerization, polycondensation or polyaddition products used in accordance with the invention and comprising metal salt nanogel (and thus water-resistant) is illustrated by the examples which follow.

EXAMPLES

Preparation of Aqueous Dispersions (D-II) of a Polymerization, Polycondensation or Poly-Addition Product Polymer Dispersion 1

While conveying nitrogen through the system, a solution of 1.0 g of Dowfax 2A1, an emulsifier from Dow Chemical Company, and 350 g of water is heated to 90° C. At a pH of 6-7, simultaneously, a) a mixture of 20 g of methyl methacrylate and 30 g of butyl acrylate, and b) 50 g of a 1% strength aqueous azobiscyanovaleric acid solution adjusted to a pH of 7, are metered into this solution over the course of 2 hours. Thereafter the system is stirred at 90° C. for 4 hours more. Distillative removal of 50 g of water gives a finely divided latex. The solids content is adjusted by addition of water.
Data: Solids: 10% by weight
Particle size: 75 nm Polymer Dispersion 2

While conveying nitrogen through the system, a solution of 800 mg of dodecylbenzenesulfonate and 250 g of water is heated to 90° C. At a pH of 6-7, simultaneously, 50 g of styrene and 50 g of a 1% strength aqueous potassium peroxodisulfate solution adjusted to a pH of 7, are metered into this solution over the course of 2 hours. Thereafter the system is stirred at 90° C. for 4 hours more. Distillative removal of 40 g of water gives a finely divided polystyrene latex. The solids content is adjusted by addition of water.
Data: Solids: 15% by weight
Particle size: 60 nm Polymer Dispersion 3

407.4 g (0.2396 mol) of hexanediol/neopentylglycol polyadipate are dewatered at 120° C. under a water jet vacuum. At 70-80° C., 77.7 g (0.4625 mol) of 1,6-diisocyanatohexane are added and the mixture is stirred at 100° C. for 1.5 h. The prepolymer has an NCO content of 3.4%. After 33% dissolution in acetone, 75.0 g (0.1924 mol) of 2-aminoethyl-β-aminopropionic acid Na salt (39.5% strength in water) are added at 50° C., followed after 7 minutes by dispersion with 1160 ml of fully demineralized water. Distillative removal of the acetone under a water jet vacuum gives a very finely divided dispersion.
Data: Solids: 30% by weight
Particle size: 60 nm Preparation of Aqueous Dispersions (D-I) Comprising Metal Salt Nanogels by a 3-Stage Process Stage 1

Under nitrogen, 23 g of a 45% strength aqueous solution of sodium dodecyl diphenyl ether disulfonate were added to 3400 g of deionized water. Then, at 75° C. and with vigorous stirring, 200 g of a monomer mixture of 1245 g of methyl acrylate and 100 g of freshly distilled trivinylcyclohexane are added. After 10 minutes, 88 g of a solution of 8.25 g of potassium peroxodisulfate in 260 g of water (initiator solution) and subsequently, at 80 to 83° C., simultaneously the remainder of the initiator solution are added. After 30 minutes the mixture is admixed with a solution of 88 mg of tert-butyl hydroperoxide and 440 mg of sodium dodecyl diphenyl ether disulfonate in 4.5 g of distilled water and also with a solution of 800 mg of ascorbic acid in 87 g of distilled water, and stirring is continued at 80 to 83° C. for 2 hours. Small amounts of precipitated polymer are removed by filtration. A crosslinked acrylate latex is obtained.

Stage II 2560 g of the latex prepared according to stage I are admixed with 101 g of potassium hydroxide in 4000 g of distilled water and, after 7-hour stirring, with a further 223 g of potassium hydroxide in 875 ml of water, after which the mixture is stirred at boiling temperature for 20 hours more until the pH is 10. The acrylate units in the resultant latex are in the form of the potassium salt. The latex is dialyzed and adjusted to a solids content of 15% by weight.

Stage III

A: Dispersion Comprising Copper(II) Salt Nanogel 50 g of latex from stage II with a solids content of 15% by weight are stirred over the course of 30 minutes with a solution of 0.50 g of copper(II) sulfate pentahydrate in 10.0 g of water. This gives a nanogel containing copper(II) ions, in the form of an aqueous dispersion.

B: Dispersion Comprising Iron(II) Salt Nanogel 500 g of latex from stage II with a solids content of 15% by weight are stirred over the course of 30 minutes under nitrogen with a solution of 12.3 g of iron(II) chloride tetrahydrate in 250 ml of water. Subsequently the dispersion is dialyzed for 48 hours. This gives a nanogel containing iron(II) ions, in the form of an aqueous dispersion.

Use Example 1

10 g of polymer dispersion 3 are diluted with 10 g of water. Added dropwise with stirring are 5 g of the aqueously dispersed nanogel A containing copper(II) ions. This gives an aqueous coating solution containing copper(II) ions (dispersion of type (D-III)).

A PET film is coated with this coating solution using a manual doctor blade, and dried at room temperature. A fully transparent film with a pale blue color, containing copper(II) ions, is obtained. The film is water-resistant, biocidal, and exhibits a barrier effect with respect to ammonia and amines. The copper ions are distributed homogeneously in the coating of the film.

Use Example 2

40 g of polymer dispersion 1 are admixed dropwise with stirring with 5 g of the aqueous nanogel A containing copper (II) ions. This gives an aqueous coating solution containing copper(II) ions (dispersion of type (D-III)).

A polycarbonate film is coated with this coating solution using a manual doctor blade, and dried at 60° C. A fully transparent film with a pale blue color, containing copper(II) ions, which is water-resistant and biocidal, is obtained. The copper ions are distributed homogeneously in the coating of the film.

The invention claimed is:

1. A method of preparing an aqueous dispersion (D-III) comprising metal ions, characterized in that an aqueous dispersion (D-I) comprising metal salt nanogel is blended with an aqueous dispersion (D-II) of a polymerization product, polycondensation product or polyaddition product, and characterized in that a water-resistant product is produced when water is removed from the aqueous dispersion (D-III) when subjected to conditions to undergo at least partial coalescence.

2. The method of claim 1, characterized in that the metal salt nanogel is in the form of polymeric particles having a diameter of the equal-volume spheres of not more than about 500 nm, which contain at least one anionically charged polymer and, as counterions, positive ions of at least one metal or metal complex.

3. The method of claim 1, characterized in that the dispersion (D-I) comprising metal salt nanogel is prepared by an at least three-stage method, where first of all (i) a dispersion comprising crosslinked methacrylic ester or acrylic ester units is prepared, thereafter (ii) the ester groups are subjected to at least partial alkaline hydrolysis by addition of alkali metal hydroxide or ammonium hydroxide, and subsequently (iii) the alkali metal or ammonium hydroxide ions are at least partly replaced by polyvalent ions.

4. The method of claim 2, characterized in that, relative to the total molar amount of the counterions, divalent and/or polyvalent ions make up from about 1 to about 100 mol %.

5. The method of claim 2, characterized in that, based on the total molar amount of the counterions, monovalent silver ions make up from about 1 to about 100 mol %.

6. The method of claim 1, characterized in that the metal salt nanogel comprises a polymer of the following formula:

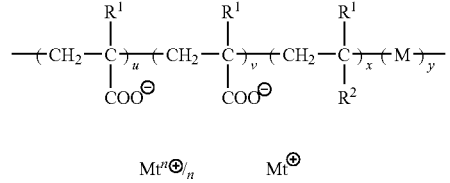

in which
R$^1$ is hydrogen, methyl or carboxymethyl,
R$^2$ is the radical of an organic crosslinker compound having at least one further copolymerizable or copolymerized C—C double bond,
M is polymerized units of an ethylenically unsaturated monomer which is copolymerizable with acrylic acid, methacrylic acid, acrylic ester or methacrylic ester,
Mt$^{n\oplus}$ is an n-valent metal cation with n=2, 3 or 4 of at least one metal,
Mt$^{\oplus}$ is an alkali metal cation or an ammonium cation,
u, v, x, y are the molar fractions of the polymerized monomers present in the copolymer, in mol %, and specifically:
u 5-99 mol %,
x 0.5-10 mol %,
v+y 0-94.5 mol %.

7. The method of claim 6, characterized in that the metal ions Mt$^{n\oplus}$ are polyvalent ions of magnesium, calcium, strontium, barium, iron, cobalt, nickel, copper, zinc, lead, cadmium, tin, mercury, bismuth, gold, uranium, aluminum, antimony, cerium, chromium, europium, gallium, germanium, indium, lutetium, manganese, neodymium, osmium, palladium, platinum, plutonium, radium, rhenium, rhodium, rubidium, ruthenium, samarium, scandium, tantalum, tellurium, terbium, thallium, thorium, thulium, titanium, tungsten, uranium, vanadium, ytterbium and/or zirconium, it also being possible for the metal ions to be bound in complex form.

8. An aqueous dispersion D-III produced by the method of claim 1.

9. A method of producing a solid intermediate, characterized in that water is removed from the aqueous dispersion of claim 8.

10. A solid intermediate produced by the method of claim 9.

11. A method of producing a water-resistant product, characterized in that the aqueous dispersion of claim 8 or the solid intermediate of claim 10 are subjected to conditions under which they undergo at least partial coalescence.

12. A water-resistant product produced by a method of claim 11.

13. An article or preparation comprising an aqueous dispersion of claim 8 or a solid intermediate of claim 10.

14. The article or preparation of claim 13, which is in the form of moldings, coating materials, films or a masterbatch for the functional treatment of plastics.

15. A film coated with the article or the preparation of claim 13.

16. The article or preparation of claim 13, wherein the article or preparation possesses an antistatic effect.

17. The article or preparation of claim 13, wherein the article or preparation possesses an optical filter effect.

18. The article or preparation of claim 13, wherein the article or preparation is optically transparent.

19. The article or preparation according to claim 13, wherein the article or preparation possesses a barrier effect and/or absorption effect with respect to oxygen, moisture, chemical compounds, gaseous compounds, electromagnetic radiation or radioactive radiation.

20. An article or preparation comprising a water-resistant product produced by a method characterized in that the aqueous dispersion of claim 8 or the solid intermediate of claim 10 are subjected to conditions under which they undergo at least partial coalescence.

21. The article or preparation of claim 20, which is in the form of moldings, coating materials, films or a masterbatch for the functional treatment of plastics.

22. A film coated with the article or the preparation of claim 20.

23. The article or preparation of claim 20, wherein the article or preparation possesses an antistatic effect.

24. The article or preparation of claim 20, wherein the article or preparation possesses an optical filter effect.

25. The article or preparation of claim 20, wherein the article or preparation is optically transparent.

26. The article or preparation according to claim 20, wherein the article or preparation possesses a barrier effect and/or absorption effect with respect to oxygen, moisture, chemical compounds, gaseous compounds, electromagnetic radiation or radioactive radiation.

* * * * *